Figure 1:
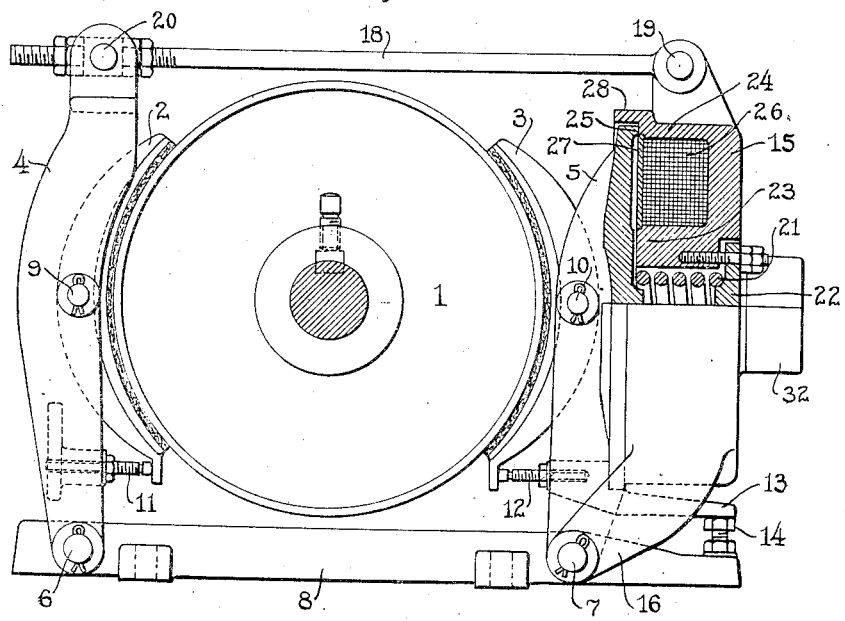

B. E. FERNOW, Jr.
ELECTROMAGNETIC BRAKE.
APPLICATION FILED DEC. 16, 1918.

1,410,395.

Patented Mar. 21, 1922.

Inventor
Bernhard E. Fernow, Jr.
By Frank A. Hubbel
Attorney

UNITED STATES PATENT OFFICE.

BERNHARD E. FERNOW, JR., OF MILWAUKEE, WISCONSIN, ASSIGNOR TO THE CUTLER-HAMMER M'F'G CO., OF MILWAUKEE, WISCONSIN, A CORPORATION OF WISCONSIN.

ELECTROMAGNETIC BRAKE.

1,410,395.      Specification of Letters Patent.      Patented Mar. 21, 1922.

Application filed December 16, 1918. Serial No. 266,925.

*To all whom it may concern:*

Be it known that I, BERNHARD E. FERNOW, Jr., a citizen of the United States, residing at Milwaukee, in the county of Milwaukee and State of Wisconsin, have invented new and useful Improvements in Electromagnetic Brakes, of which the following is a full, clear, concise, and exact description, reference being had to the accompanying drawing, forming a part of this specification.

This invention relates to improvements in electromagnetic brakes.

In practice there are many instances where it is desired to employ brakes of the drum type having mechanical and electromagnetic operating means, one to set the same and the other to effect release thereof and where it is extremely desirable, as in crane installations, to minimize the overhead space required. On the other hand, brakes of this type require relatively large electromagnets and have, as heretofore constructed, either required mounting of the electromagnet to project above the drum, or the use of linkage for reducing or changing the direction of motion, such linkage not only adding complications but being subject to rapid wear under severe service conditions.

The present invention has among its objects to provide an efficient, compact and durable brake of the aforesaid type wherein the electromagnet is so positioned as to materially reduce the overhead space required by the brake without resorting to linkage.

A further object is to provide a brake of such design as to materially reduce the required movements of the actuating parts.

Various other objects and advantages of the invention will hereinafter appear.

The accompanying drawing illustrates a brake embodying the invention in one form and the same will now be described, it being understood that the brake illustrated is susceptible of various modifications without departing from the scope of the appended claims.

Figure 2:
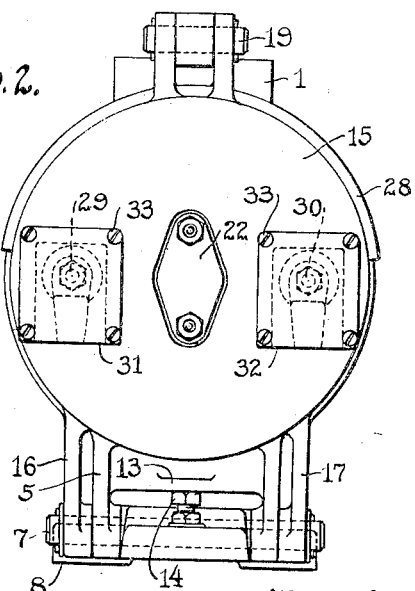

In the drawing,

Figure 1 is a side elevation of the brake with the electromagnet shown partially in section; and, Fig. 2 is an end view of Fig. 1.

Referring to the drawing, the same illustrates a brake drum 1 to be secured to the motor or other device to be braked, opposed shoes 2 and 3 to frictionally engage said drum and levers 4 and 5 supporting said shoes respectively. The levers 4 and 5 have pivots 6 and 7 respectively on a base 8 and the shoes 2 and 3 have pivots 9 and 10 respectively on said levers in line with the center of the drum, said levers being provided with adjustable stops 11 and 12 respectively for the lower ends of said shoes. Further, the lever 5 is provided with an outwardly extending lug 13 adapted to abut an adjustable stop 14 on the base to limit the outward movement of said lever.

The lever 5 constitutes the armature of an electromagnet having a field member 15 supported by lugs 16 and 17 on the pivot pin of said lever 5 and connected at its upper extremity by a link 18 to the lever 4, said link having a pivotal connection 19 with the field member and an adjustable pivotal connection 20 with lever 4. Thus the field member and armature member of the electromagnet are connected to the brake shoes 2 and 3 respectively and said members are biased apart by an interposed helical spring 21 supported within the field member. The spring accordingly serves to set the brake shoes against the drum, the braking intensity being variable by an adjustable abutment plate 22 for the spring, provided on the field member. On the other hand, energization of the electromagnet attracts its field and armature members to compress the spring and to withdraw the brake shoes from the drum, and with the stop 14 on the base properly adjusted, the same will limit the withdrawal of shoe 3 to insure an equal movement of the shoe 2 away from the drum, the concentric mountings of both members of the electromagnet permitting the latter to assume the proper position for such result without relative movement of its members.

The field member of the electromagnet is of annular form, being provided with concentric inner and outer poles 23 and 24 and the lever 5 is provided with a circular portion 25 to be attracted against the outer pole but designed to have a slight clearance with the inner pole. The field member has an energizing winding 26 arranged within an annular recess between its poles, said winding being secured in place by a ring 27 preferably of aluminum and said field member is provided adjacent to its outer pole with a flange 28 overhanging the edge of the armature with a slight clearance and extending peripherally around the armature as far as practicable. As illustrated in Fig. 2 this flange extends around the upper half of the armature and functions to protect the pole faces of the electromagnet from rain, snow, ice, dirt, etc., while at the same time it also functions to reduce the reluctance of the magnetic circuit of the electromagnet when its members are separated with the result of increasing the magnetic lines of force traversing the inner pole to such an extent as to materially increase the effective pull of the electromagnet.

The electromagnet is so positioned that its axis and the axis of spring 21 are in line with the center of the brake drum and the centers of the brake shoes. Accordingly, the electromagnet may be of a diameter substantially equal to that of the brake drum without increasing the overhead space required by the brake and link 18. Moreover this arrangement enables the desired movement of the brake shoes by a very small relative movement of the members of its electromagnet. In fact, the construction illustrated only requires a degree of movement of each member of the electromagnet substantially equal to the desired degree of movement of its respective shoe or in other words, an average relative movement of said members substantially equal to the relative movement of said shoes. This minimizes the amount of turning on the pivot pin or pins subject to wear by the spring reaction and with the connections illustrated the number of such pins is greatly reduced and the turning thereon is so negligible as to render the same practically free from wear. Moreover it is to be understood that such advantages are not dependent upon exact positioning of the parts in the relation shown and that approximate alignment of the centers of the electromagnet and brake shoes will suffice in many instances.

Also, the construction illustrated is such as to greatly facilitate removal of the brake shoes for renewal of the linings thereof. As will be apparent, disconnection of the link 18 from the lever 4 or the field member 15 of the electromagnet or both allows the shoe supporting levers to be spread, whereupon either shoe may be readily removed upon withdrawal of its pivot pin.

The winding of the electromagnet is preferably impregnated and sealed in the field member with a water-proof insulating compound, the terminals of said winding being connected to terminal lugs 29 and 30 provided on the back of said field member. Also, to complete the protection of the current carrying parts, the terminal lugs are respectively provided with covers 31 and 32 secured to the field member as by screws 33.

What I claim as new and desire to secure by Letters Patent is:

1. The combination with a brake drum and opposed brake shoes therefor of actuating means for said brake shoes including an electro-magnet and operative connections between said brake shoes and relatively movable parts of said electro-magnet, said electro-magnet being mounted at one side of the axis of said drum and adjacent the periphery thereof and having its axis substantially perpendicular to the axis of said drum and also adjacent thereto.

2. The combination with a brake drum and opposed brake shoes therefor of actuating means for said brake shoes including an electro-magnet having relatively movable pivoted members each operatively connected to one of said brake shoes, said electro-magnet being mounted at one side of the axis of said drum and having its axis substantially perpendicular to the axis of said drum and in substantially the same plane as said latter axis.

3. The combination with a brake drum and opposed brake shoes therefor of actuating means for said brake shoes including an electro-magnet and operative connections between said shoes and relatively movable parts of said electro-magnet, said electro-magnet being mounted at one side of the axis of said drum and adjacent the periphery thereof and having its axis substantially perpendicular to the axis of said drum and intermediate the end faces thereof.

4. The combination with a brake drum and opposed brake shoes therefor of actuating means for said brake shoes including an electro-magnet having relatively movable parts operatively connected to said brake shoes respectively, said electro-magnet being mounted on one side of the axis of said drum and substantially within the vertical space required by the latter and having its axis substantially perpendicular to the axis of said drum and midway between the end faces thereof.

5. The combination with a brake drum and opposed brake shoes therefor of actuating means for said brake shoes including a spring, an electro-magnet and operative connections whereby one acts upon both of said brake shoes to set the same against said drum while the other acts upon both of said brake shoes to release the same, said electro-magnet and said spring being so positioned that their respective forces act substantially in line with the centers of said brake shoes.

6. The combination with a brake drum and opposed brake shoes therefor of actuating means for said brake shoes including an electro-magnet mounted at one side of the axis of said drum and adjacent the periphery thereof, said electro-magnet having pivoted armature and field members, each connected to one of said brake shoes and movable in a plane substantially perpendicular to the axis of said drum.

7. The combination with a brake drum and opposed brake shoes therefor of actuating means for said brake shoes including an electro-magnet mounted adjacent the periphery of said drum and having pivoted armature and field members, one of said members being directly connected to one of said shoes and a link connection between the other said members and the other of said shoes.

8. The combination with a brake drum and opposed brake shoes therefor, of actuating means for said brake shoes including an electromagnet having a field member and a pivoted armature member, said means providing for relative movement of said brake shoes substantially equal to the average movement of said field and armature members relatively.

9. The combination with a brake drum and opposed brake shoes therefor, of actuating means for said brake shoes including an electromagnet having a pivoted armature member supporting one of said brake shoes.

10. The combination with a brake drum and opposed brake shoes therefor, of actuating means for said brake shoes including an electromagnet having concentrically pivoted armature and field members, each of said members being connected to one of said brake shoes.

11. The combination with a brake drum and opposed brake shoes therefor, of actuating means for said brake shoes including an electromagnet having concentrically pivoted armature and field members, each of said members being connected to one of said brake shoes and one of said members supporting its respective brake shoe.

12. The combination with a brake drum and opposed brake shoes therefor, one of the same having a supporting lever, of an electromagnet having concentrically pivoted armature and field members, the former supporting another of said brake shoes and the latter having a link connection with said lever.

13. The combination with a brake drum and opposed brake shoes therefor, one of the same having a supporting lever, of an electromagnet having concentrically pivoted armature and field members, the former supporting another of said brake shoes and the latter having a link connection with said lever and a spring associated with said electromagnet to bias its armature and field members apart.

14. The combination with a brake drum and opposed brake shoes therefor, one of said shoes having a supporting lever, of an electromagnet having concentrically pivoted armature and field members, one of said members supporting another of said brake shoes and having a stop and the other of said members having a connection with said lever, and a spring associated with said armature and field members to spread the same, said stop functioning to insure substantially equal movements of said brake shoes by said electromagnet.

15. In a brake, the combination with cooperating braking parts, of actuating means for certain of said parts including an electromagnet having armature and field members, the latter having inner and outer poles and one of said member having a flange to overhang the other member for protection of their polar faces and for reduction of the air gap between the outer pole of said field member and said armature.

16. In a brake, the combination with cooperating braking parts, of actuating means for certain of said parts, including an electromagnet having a field member and a pivoted armature member, the former having inner and outer poles and one of said members having a flange to overhang the other member for protection of their polar faces and for reduction of the air gap between the outer poles of said field member and said armature member.

17. In a brake, the combination with a drum and opposed brake shoes, one having a supporting lever, of an electromagnet having concentrically pivoted field and armature members, the latter supporting the other of said brake shoes and the former having a connection with said lever, said electromagnet being so disposed that its force acts substantially radially of said drum and substantially in line with the centers of said shoes.

18. In a brake, the combination with a drum and opposed brake shoes therefor, one having a supporting lever, of an electromagnet having concentrically pivoted field and armature members, the latter supporting the other of said brake shoes, a connection between said field member and said lever, and a spring to bias the armature and field members apart, said electromagnet and spring being arranged whereby the forces of both act substantially radially of said drum and substantially in line with the centers of said brake shoes.

19. In a brake, the combination with a drum and opposed brake shoes, one having a supporting lever, of an electromagnet having an annular field member and an armature member pivoted concentrically, said armature member supporting the other of said brake shoes, a link connecting said field member and said lever and a spring centrally mounted in said field member to bias said members apart.

20. In a brake, the combination with a drum and opposed brake shoes, one having a supporting lever, of an electromagnet having an annular field member and an armature member pivoted concentrically, said armature member supporting the other of said brake shoes, a link connecting said field member and said lever and a spring centrally mounted in said field member to bias said members apart, said electromagnet being so disposed that the force thereof and also the force of said spring act substantially radially of said drum and substantially in line with the centers of said brake shoes.

In witness whereof, I have hereunto subscribed my name.

BERNHARD E. FERNOW, Jr.